United States Patent
Zhang

(10) Patent No.: US 10,462,245 B2
(45) Date of Patent: Oct. 29, 2019

(54) METHOD, TERMINAL, AND SYSTEM FOR PUSHING INFORMATION

(71) Applicant: TENCENT TECHNOLOGY (SHENZHEN) COMPANY LIMITED, Shenzhen (CN)

(72) Inventor: Junbao Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 689 days.

(21) Appl. No.: 15/170,997

(22) Filed: Jun. 2, 2016

(65) Prior Publication Data

US 2016/0277520 A1  Sep. 22, 2016

Related U.S. Application Data

(63) Continuation of application No. PCT/CN2014/077159, filed on May 9, 2014.

(30) Foreign Application Priority Data

Dec. 9, 2013 (CN) .......................... 2013 1 0662580

(51) Int. Cl.
*H04L 29/08* (2006.01)
*H04L 29/06* (2006.01)
*H04W 80/08* (2009.01)

(52) U.S. Cl.
CPC .......... *H04L 67/26* (2013.01); *H04L 67/145* (2013.01); *H04L 67/42* (2013.01); *H04W 80/08* (2013.01)

(58) Field of Classification Search
CPC ....... H04L 43/10; H04L 43/103; H04L 67/14; H04L 67/26; H04L 67/42; H04L 67/145; H04W 80/08
See application file for complete search history.

(56) References Cited

U.S. PATENT DOCUMENTS

| 7,426,569 B2 * | 9/2008 | Dunk ...................... H04L 67/14 709/203 |
| 7,768,939 B1 * | 8/2010 | Trivedi ................... H04L 43/10 370/252 |

(Continued)

FOREIGN PATENT DOCUMENTS

| CN | 1968527 A | 5/2007 |
| CN | 102036349 A | 4/2011 |

(Continued)

OTHER PUBLICATIONS

The World Intellectual Property Organization (WIPO) International Search Report for PCT/CN2014/077159 dated Sep. 19, 2014.

(Continued)

*Primary Examiner* — Patrice L Winder
(74) *Attorney, Agent, or Firm* — Anova Law Group, PLLC

(57) ABSTRACT

Methods, terminals, and systems for pushing information are provided. A terminal obtains a business message from a server and determines a type of the business message from a real-time type, a timer-setting type, and an instruction-type. When the type of the business message is determined to be the real-time type, the terminal adjusts a sending interval of a heartbeat package as a first pre-set time duration and restores the sending interval of the heartbeat package back to a benchmark time interval after a second pre-set time duration. The first pre-set time duration is greater than the benchmark time interval and less than the second pre-set time duration. The terminal maintains a network link connection with the server based on the sending policy of the heartbeat package to provide a pushing operation of the business message.

19 Claims, 5 Drawing Sheets

(56) References Cited

U.S. PATENT DOCUMENTS

| | | | | |
|---|---|---|---|---|
| 8,090,826 | B2* | 1/2012 | Tran | G06F 15/173 |
| | | | | 709/225 |
| 8,099,505 | B2* | 1/2012 | Tran | H04L 41/5019 |
| | | | | 709/227 |
| 8,489,111 | B2 | 7/2013 | Chawla | |
| 8,490,075 | B2* | 7/2013 | Waris | H04L 51/32 |
| | | | | 709/203 |
| 8,649,768 | B1* | 2/2014 | Gaddam | H04W 12/06 |
| | | | | 455/411 |
| 8,745,157 | B2* | 6/2014 | Bradnick | H04L 1/1642 |
| | | | | 709/217 |
| 8,934,877 | B2* | 1/2015 | Toksvig | H04W 4/90 |
| | | | | 455/414.1 |
| 8,959,235 | B1* | 2/2015 | Newstadt | H04L 69/28 |
| | | | | 709/227 |
| 8,971,194 | B2* | 3/2015 | Tofighbakhsh | H04W 52/0251 |
| | | | | 370/241 |
| 9,338,748 | B2* | 5/2016 | Wang | H04W 4/70 |
| 2004/0176107 | A1* | 9/2004 | Chadha | H04W 4/02 |
| | | | | 455/456.5 |
| 2008/0082142 | A1 | 4/2008 | Clark et al. | |
| 2008/0104258 | A1* | 5/2008 | O'Neill | H04L 67/325 |
| | | | | 709/228 |
| 2010/0172483 | A1 | 7/2010 | Weiner | |
| 2010/0228863 | A1* | 9/2010 | Kawauchi | H04L 65/1083 |
| | | | | 709/227 |
| 2011/0047232 | A1* | 2/2011 | Backholm | H04W 76/10 |
| | | | | 709/206 |
| 2011/0231562 | A1* | 9/2011 | Karlsen | H04L 65/1016 |
| | | | | 709/228 |

FOREIGN PATENT DOCUMENTS

| | | |
|---|---|---|
| CN | 102523178 A | 6/2012 |
| CN | 102769603 A | 6/2012 |
| CN | 102685768 A | 9/2012 |
| CN | 102752722 A | 10/2012 |
| CN | 103297934 A | 9/2013 |
| JP | 2012222378 A | 11/2012 |
| WO | 2013109550 A1 | 7/2013 |

OTHER PUBLICATIONS

Taiwan Intellectual Property Office (TIPO) Office Action 1 for 103142497 dated Dec. 2, 2015.

The Japan Patent Office (JPO) Notification of Reasons for Refusal for Application No. 2016-536905 and Translation Sep. 5, 2017 8 Pages.

The State Intellectual Property Office of the People's Republic of China (SIPO) Office Action 1 for 201310662580.6 dated Jan. 10, 2018 9 Pages (including translation).

* cited by examiner

METHOD, TERMINAL, AND SYSTEM FOR PUSHING INFORMATION

CROSS-REFERENCES TO RELATED APPLICATIONS

This application is a continuation application of PCT Patent Application No. PCT/CN2014/077159, filed on May 9, 2014, which claims priority to Chinese Patent Application No. 201310662580.6, filed on Dec. 9, 2013, the entire content of both of which is incorporated herein by reference.

FIELD OF THE DISCLOSURE

The present disclosure generally relates to the field of mobile internet technology and, more particularly, relates to methods, terminals, and systems for pushing information.

BACKGROUND

With the development of mobile internet technology, the technology for pushing information has become an important part in applications of a variety of platforms (e.g., an Android platform). Currently, there are many information pushing schemes including JPush (pushing via Jabber), and other private pushing modules for businesses of various internet application products including information pushing for Tencent news, Netease news, etc.

Conventional pushing schemes often use heartbeat packages to maintain TCP persistent connection with the pushing backend to receive the pushed information. However, conventional pushing schemes have drawbacks. One of the drawbacks includes the overly-consumed terminal power. For mobile terminals (for example, an Android mobile phone), applications installed thereon may overly consume the power of the mobile terminal and thus cannot meet the needs from the users who apparently desire for long-time use of the mobile terminal.

BRIEF SUMMARY OF THE DISCLOSURE

One aspect or embodiment of the present disclosure includes a method for pushing information. In the method, a terminal obtains a business message from a server and determines a type of the business message from a real-time type, a timer-setting type, and an instruction-type. When the type of the business message is determined to be the real-time type, the terminal adjusts a sending interval of a heartbeat package as a first pre-set time duration and restores the sending interval of the heartbeat package back to a benchmark time interval after a second pre-set time duration. The first pre-set time duration is greater than the benchmark time interval and less than the second pre-set time duration. The terminal maintains a network link connection with the server based on the sending policy of the heartbeat package to provide a pushing operation of the business message.

Optionally, that the terminal obtains the business message includes: the terminal receives the business message pushed from the server or pulls the business message from the server by the terminal.

After determining the type of the business message, and when the type of the business message is determined to be the timer-setting type, the terminal adjusts the sending interval of the heartbeat package as a third pre-set time duration, and restores the sending interval of the heartbeat package back to the benchmark time interval after a fourth pre-set time duration. The third pre-set time duration is greater than the benchmark time interval and less than the fourth pre-set time duration.

After determining the type of the business message and when the type of the business message is determined to be the instruction-type, the terminal stops a heartbeat package process.

Before obtaining the business message from the server, the terminal establishes the network link connection with the sever using a registration package; and starts the heartbeat package process to maintain the network link connection with the server. After establishing the network link connection with the sever using the registration package, the terminal receives a pushing policy released from the server. The pushing operation of the business message by the terminal includes receiving the business message pushed by the server, when the network link connection is a persistent connection; or pulling the business message from the server, when the network link connection is not a persistent connection.

The step of pushing operation of the business message includes that the terminal pulls the business message at a pre-set time before a set time, when the type of the business message is determined to be the timer-setting type. Optionally, the terminal switches a network link status between the terminal and the server, after the terminal detects a change of a network type.

Another aspect or embodiment of the present disclosure includes a terminal for pushing information. The terminal includes an obtaining module, an adjusting module, and a pushing operating module.

The obtaining module is configured to obtain a business message from a server. The adjusting module is configured to determine a type of the business message from a real-time type, a timer-setting type, and an instruction-type; and to adjust a sending interval of a heartbeat package as a first pre-set time duration and to restore the sending interval of the heartbeat package back to a benchmark time interval after a second pre-set time duration, when the type of the business message is determined to be the real-time type. The first pre-set time duration is greater than the benchmark time interval and less than the second pre-set time duration.

The pushing operating module is configured to maintain a network link connection with the server based on the adjusted sending policy of the heartbeat package to provide a pushing operation of the business message.

The obtaining module is further configured to receive the business message pushed from the server or to pull the business message from the server. The adjusting module is further configured to adjust the sending interval of the heartbeat package to a third pre-set time duration and to restore the sending interval of the heartbeat package back to the benchmark time interval after a fourth pre-set time duration, when the type of the business message is determined to be the timer-setting type; and to stop a heartbeat package process, when the type of the business message is determined to be the instruction-type. The third pre-set time duration is greater than the benchmark time interval and less than the fourth pre-set time duration.

The terminal further includes a starting module configured to establish the network link connection with the sever using a registration package and to start the heartbeat package process to maintain the network link connection with the server. The starting module is further configured to receive a pushing policy released from the server, after establishing the network link connection with the sever using the registration package.

The pushing operating module is further configured to receive the business message pushed from the server, when the network link connection is a persistent connection; or to pull the business message from the server, when the network link connection is not a persistent connection.

The pushing operating module is further configured to pull the business message at a pre-set time before a set time, when the type of the business message is determined to be the timer-setting type. The pushing operating module is also configured to switch a network link status between the terminal and the server, after a change of a network type is detected.

A system for pushing information is provided including a server and a terminal. The server is configured to release the business message to the terminal; to maintain the network link connection with the terminal based on the sending policy of the heartbeat package adjusted by the terminal according to the type of the business message; and to perform the pushing operation of the business message.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Various embodiments provide methods, terminals, and systems for pushing information. The exemplary methods, terminals, and systems can be implemented, for example, in an exemplary environment 800 as shown in FIG. 8.

Figure 8:
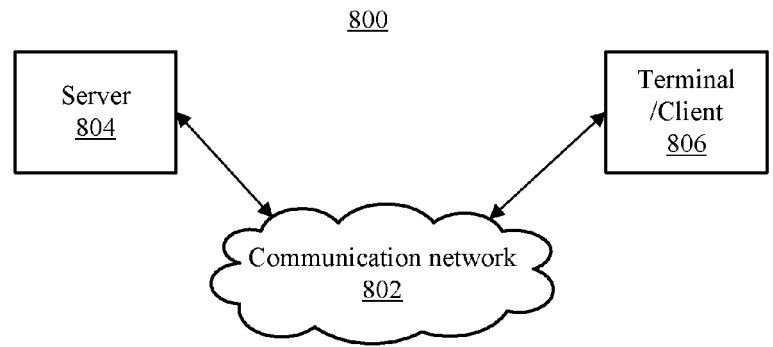
FIG. 8 depicts an exemplary environment incorporating certain disclosed embodiments.

In FIG. 8, the exemplary environment 800 can include a server 804, a terminal 806, and a communication network 802. The server 804 and the terminal 806 may be coupled through the communication network 802 for information exchange, for example, Internet searching, webpage browsing, etc. Although only one terminal 806 and one server 804 are shown in the environment 800, any number of terminals 806 or servers 804 may be included, and other devices may also be included.

The communication network 802 may include any appropriate type of communication network for providing network connections to the server 804 and terminal 806 or among multiple servers 804 or terminals 806. For example, the communication network 802 may include the Internet or other types of computer networks or telecommunication networks, either wired or wireless.

A terminal, as used herein, may refer to any appropriate user terminal device with certain computing capabilities, for example, a personal computer (PC), a work station computer, a notebook computer, a car computer (e.g., carrying in a car or other vehicles), a server computer, a hand-held computing device (e.g., a tablet computer), a mobile terminal (e.g., a mobile phone, a smart phone, an iPad, and/or an aPad), a POS (i.e., point of sale) device, or any other user-side computing device. In various embodiments, the terms "terminal" and "terminal device" can be used interchangeably. In various embodiments, the terminal 806 can be a mobile phone.

A server, as used herein, may refer one or more server computers configured to provide certain server functionalities, for example, search engines and database management. A server may also include one or more processors to execute computer programs in parallel.

Figure 9:
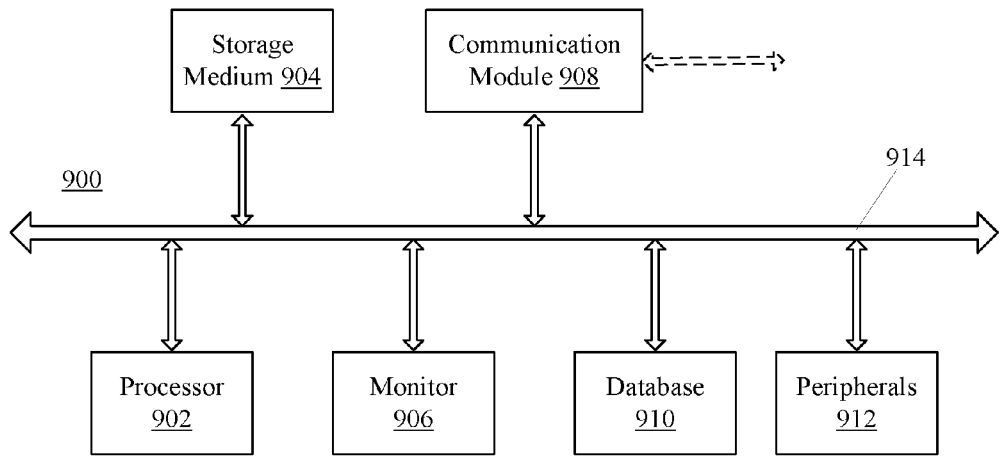
FIG. 9 depicts an exemplary computer system consistent with the disclosed embodiments.

The server 804 and the terminal 806 may be implemented on any appropriate computing platform. FIG. 9 shows a block diagram of an exemplary computing system 900 capable of implementing the server 804 and/or the terminal 806. As shown in FIG. 9, the exemplary computer system 900 may include a processor 902, a storage medium 904, a monitor 906, a communication module 908, a database 910, peripherals 912, and one or more bus 914 to couple the devices together. Certain devices may be omitted and other devices may be included.

The processor 902 can include any appropriate processor or processors. Further, the processor 902 can include multiple cores for multi-thread or parallel processing. The storage medium 904 may include memory modules, for example, ROM, RAM, and flash memory modules, and mass storages, for example, CD-ROM, U-disk, removable hard disk, etc. The storage medium 904 may store computer programs for implementing various processes, when executed by the processor 902.

Further, the peripherals 912 may include I/O devices, for example, keyboard and mouse, and the communication module 908 may include network devices for establishing connections through the communication network 802. The database 910 may include one or more databases for storing certain data and for performing certain operations on the stored data, for example, webpage browsing, database searching, information pushing or pulling etc.

In operation, the terminal 806 may cause the server 804 to perform certain actions, for example, an Internet search or other database operations. The server 804 may be configured to provide structures and functions for such actions and operations. More particularly, the server 804 may include a data searching system for real-time database searching. In various embodiments, a terminal, for example, a mobile terminal involved in the disclosed methods and systems can include the terminal 806.

Figure 1:
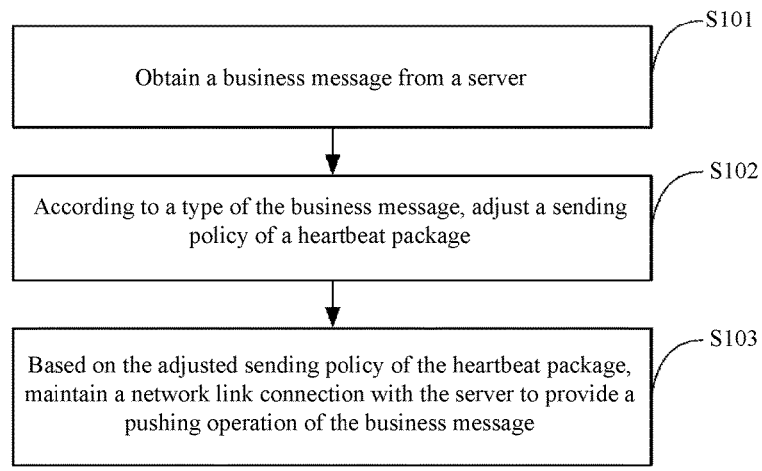
FIG. 1 depicts an exemplary method for pushing information consistent with various disclosed embodiments.

FIG. 1 depicts an exemplary method for pushing information consistent with various disclosed embodiments. In Step S101, a terminal obtains a business message from a server.

The terminal and the server can be included in an information pushing system. For example, for an Android mobile phone, the terminal side can be used for pushing module SDK (software development kit), including management of Android service and heartbeat package process, display of pushed message(s) on the mobile phone, and procedure processing of interaction with the server including sending a registration package, establishing a persistent connection with the server, sending the heartbeat package, pushing information return, etc.

The server can be used for management of request for persistent connection, business logic process, pushing information, statistical information landing, etc. In addition, the server can be used for push-web management backend, accessing management of application businesses (e.g., game business), etc.

Currently, when the terminal application pushes the business information, to maintain the network link connection between the terminal and the server (e.g., the TCP persistent connection), a fixed sending policy of heartbeat package has to be used. This leads to a large amount of power consumption of the mobile phone terminal.

As disclosed herein, according to different types of the business message pushed or released by the server, the heartbeat package process can be allowed to have different sleep time. As such, based on the types of the business message obtained by the terminal, the sending policy of the heartbeat package can be dynamically adjusted. Based on this policy, the network link connection between the terminal and the server can be maintained to provide the pushing operation of the business message and to save the power of mobile phone terminal.

In one embodiment when using an Android mobile phone as an example, after the mobile phone terminal is turned on or otherwise started, an "AndroidService" can be generated. The mobile phone terminal can then establish a connection with the server through a registration package. The terminal can start the heartbeat package process to send the heartbeat package to the server to maintain the network link connection with the server. Through the network link connection, a pushing message of an application business can be obtained.

During this process, according to different network types of the (mobile phone) terminal, the network link connection can be different. Generally, there are three exemplary network types for a mobile phone: a WiFi, Net, and Wap network (which may take up a small portion over the network types). Because the network of WiFi and the Net both support the persistent connection, while the Wap network does not support the persistent connection, when the network type of mobile phone is WiFi or Net, the network link connection between the terminal and the server can be the persistent connection and the business message obtained by the terminal can be the business message pushed by the server. When the network type of mobile phone is Wap, the network link connection between the terminal and the server is not the persistent connection. Then the pushing method needs to be changed to a pulling method. For example, the terminal can initiate the pulling of the business message from the server.

In this manner, according to the network type, the terminal needs to switch between these two connection status (e.g., a persistent connection and a non-persistent connection). During this switching, the pushing procedure also needs to be switched. In the example of using the Android system, registering the network connection status "BroadcastReceiver" can be used to receive broadcast information of a change of the network and to adjust the network link connection between the server and the terminal.

In Step S102, according to the type of the business message, the sending policy of the heartbeat package is adjusted.

In one embodiment, the sending policy of the heartbeat package can be adjusted according to different types of the business message to save the power of the mobile phone, for example. The type of business message can include a real-time type of message, a timer-setting type of message, an instruction type of message, etc.

In an exemplary game marketing business, the pushing message can include a game real-time message, a game marketing activity message, a pushing instruction message, etc. The game real-time message can include real-time messages such as the latest game version updating message, game prop promoting (or discount) message, and/or other possible real-time messages. The game marketing activity message can include activity messages of game operations and planning, which has fixed pushing times. The pushing instruction message can include pushing a closing message, pushing temporarily-released pushing policy message, etc.

As the type of the business message is different, the sending interval of the heartbeat package can be different. In an example for the real-time type of message, according to an engagement that pushing message cannot be overly frequent and according to empirical data, the probability for receiving another real-time type of message in a short period of time (e.g., about 60 minutes) from after receiving a real-time type of message can be low. The sending interval of the heartbeat package can be adjusted to be greater than a benchmark time interval appointed by the terminal and the server, such that the network connection cost and the power cost running by the CPU can be reduced and saved. Then, after the pre-set time duration, the sending interval of heartbeat package can be restored back to the benchmark time interval.

In an example for the timer-setting type of message, the time for pushing message can be pre-set. Likewise, the sending interval of heartbeat package can be adjusted to be greater than a benchmark time interval appointed by the terminal and the server, in order to save the network connection cost and the power cost running by the CPU.

In an example for the instruction type of message, e.g., for pushing a closing message, when the terminal receives such pushing instruction message, the terminal can stop sending the heartbeat package and close the network link connection with the server to save the terminal power cost for network connection.

In Step S103, based on the adjusted sending policy of the heartbeat package, the network link connection is maintained with the server to provide the pushing operation of the business message. When the message pushing system performs the pushing operation of the business message, a pushing scheme is used according to the type of the network link connection.

When the network link connection is a persistent connection, the terminal receives the business message pushed by the server. When the network link connection is not a persistent connection, the terminal pulls the business message from the server. In addition, when the type of the business message is determined to be the timer-setting type, the terminal pulls the business message at a pre-set time before a set time.

In addition, the terminal may monitor the change of the network type in real-time. After a change of the network type has been detected, the network link status can be switched between the terminal and the server to ensure a regular or normal pushing of business message.

In this manner, after the terminal receives the business message from the server, the terminal can adjust the sending policy of heartbeat package according to the type of business message. Based on the sending policy of the heartbeat package, the network link connection can be maintained with the server to provide the pushing operation for the business message. As such, the pushing requirements of various application business messages can be satisfied on the mobile terminal and the power of the mobile terminal can be saved.

Figure 2:
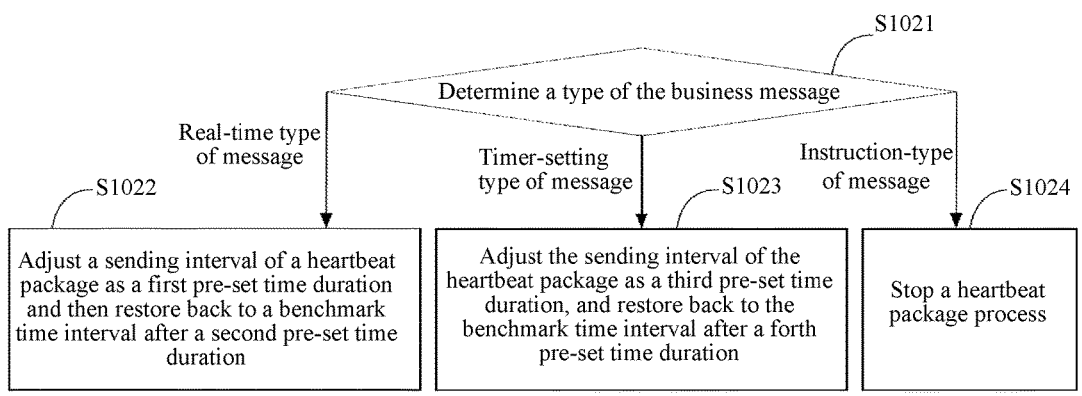
FIG. 2 is a flow diagram of adjusting a policy for sending a heartbeat package according to a type of a business message consistent with various disclosed embodiments.

Based on the method depicted in FIG. 1, FIG. 2 is a flow diagram of adjusting a policy for sending a heartbeat package according to a type of a business message consistent with various disclosed embodiments. For example, the Step S102 in FIG. 1 (e.g., adjusting the sending policy of the heartbeat package according to the type of the business message) can further include the following exemplary steps.

In Step S1021, a type of the business message is determined. When the type of the business message is determined to be a real-time type, the method proceeds to perform Step S1022. When the type of the business message is determined to be a timer-setting type, the method proceeds to perform Step S1023. When the type of the business message is determined to be an instruction-type, the method proceeds to perform Step S1024.

In Step S1022, a sending interval of a heartbeat package is adjusted as a first pre-set time duration and then restored back to a benchmark time interval after a second pre-set time duration. The first pre-set time duration can be greater than the benchmark time interval and less than the second pre-set time duration.

In Step S1023, the sending interval of the heartbeat package is adjusted as a third pre-set time duration, and restored back to the benchmark time interval after a fourth pre-set time duration. The third pre-set time duration is greater than the benchmark time interval and less than the fourth pre-set time duration.

In Step S1024, a heartbeat package process is stopped. As disclosed herein, the above described first pre-set time duration may be the same as or different from the third pre-set time duration. The above described second pre-set time duration may be same as or different from the fourth pre-set time duration.

In an exemplary game marketing business, an engaged benchmark heartbeat package interval between the terminal and sever can be about 60 seconds. In one embodiment when the terminal receives a pushing message of a game real-time type of message, according to an engagement that pushing message cannot be overly frequent and according to empirical data, the probability for receiving another real-time type of message in this short period of time (e.g., about 60 minutes) from after receiving a real-time type of message can be low. As such, the sending interval of heartbeat package can be adjusted to be about 120 seconds (e.g., as the first pre-set time duration) for the heartbeat package process to sleep for about 120 seconds. Network connection cost and the power cost for running the CPU can be reduced and saved. Then after a time period of about 60 minutes (e.g., as the second pre-set time duration), the sending interval of the heartbeat package can be restored back to the benchmark time interval for about 60 seconds.

In another embodiment when the terminal receives a pushing message of a game activity listing type of message, an activity time can be recorded, and the pushing scheme can be changed to an initiative-pulling to pull the business message to inform the user at a pre-set time before the set time (i.e., the recorded time) for the activity using a timer. Meanwhile, the sending interval of heartbeat package can be adjusted to be about 120 seconds for the heartbeat package process to sleep for about 120 seconds, so as to save the network connection cost and the power cost for running the CPU.

In still another embodiment when the terminal receives a pushing message of an instruction message, which is, for example, a pushing instruction for closing, the persistent connection can be disconnected to stop the heartbeat package process, and thus to stop the exemplary Android service to save the mobile phone power cost for the network connection. In addition, when the mobile phone is shut down or when the user closes a switch for the pushing, the pushing procedure can be closed to save the mobile phone power cost for the network connection. For example, the user can select a default setting of about 22:00 o'clock during nights to about 8:00 o'clock in the mornings to close the pushing procedure to save the mobile phone power cost for the network connection.

As such, by using the above described dynamic policies, business pushing requirements can be satisfied. While saving the mobile phone data volume, the power of the mobile phone can be saved. Note that the disclosed schemes for adjusting the sending policy of the heartbeat package according to the type of business message are not limited to the application scenarios described above, more policies and/or more subdivided policies may be adopted to adjust the policy for sending the heartbeat package.

In various embodiments, schemes for adjusting the sending policy of the heartbeat package according to the type of business message can be defined by the terminal-side, or can be released from the server to the terminal. For example, after establishing a connection between the terminal and the server through a registration package, the server can release the pushing policy to the terminal, and the terminal can parse the received pushing policy to obtain an adjusting policy for sending the heartbeat package.

Figure 3:
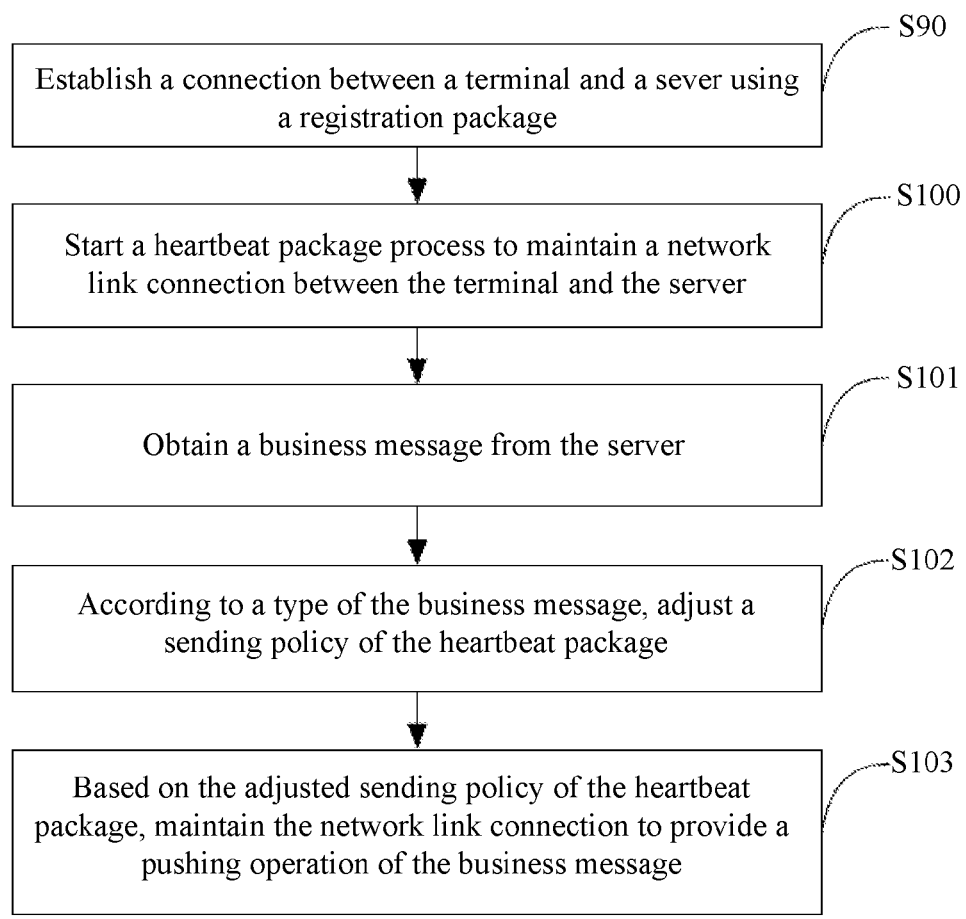
FIG. 3 depicts another exemplary method for pushing information consistent with various disclosed embodiments.

Based on the method depicted in FIG. 1, FIG. 3 depicts another exemplary method for pushing information consistent with various disclosed embodiments. For example, before implementing Step S101 for adjusting the sending policy of the heartbeat package according to the type of the business message, following exemplary steps can be included as following.

In Step S90, a connection is established between the terminal and the sever using a registration package. In Step S100, the heartbeat package process is started to maintain the network link connection with the server.

Based on the exemplary method as depicted in FIG. 1, FIG. 3 further includes a scheme for starting the heartbeat package process and establishing the initial network link connection with the server by the terminal.

In one embodiment when using an Android mobile phone as an example, after the mobile phone terminal is turned on or otherwise started, an "AndroidService" can be generated. The mobile phone terminal can then establish a connection with the server through a registration package. The terminal can start the heartbeat package process to send the heartbeat package to the server to maintain the network link connection with the server. Through the network link connection, a pushing message of an application business can be obtained.

During this process, according to different network types of the (mobile phone) terminal, the network link connection can be different. Generally, there are three exemplary network types for a mobile phone: WiFi, Net, and Wap network (which may take up a small portion over the network types). Because the network of WiFi and the Net both support the persistent connection, while the Wap network does not support the persistent connection, when the network type of mobile phone is WiFi or Net, the network link connection between the terminal and the server can be the persistent connection and the business message obtained by the terminal can be the business message pushed by the server.

When the network type of mobile phone is Wap, the network link connection between the terminal and the server is not the persistent connection. Then the pushing method needs to be changed to a pulling method. For example, the terminal can initiate the pulling of the business message from the server. In this manner, according to the network type, the terminal needs to switch between these two connection status (e.g., a persistent connection and a non-persistent connection). During this switching, the pushing procedure also needs to be switched.

In the example of using the Android system, registering the network connection status "BroadcastReceiver" can be used to receive broadcast information of a change of the network and to adjust the network link connection between the server and the terminal. By establishing the initial network link connection, the terminal can obtain the business message pushed from the system.

In this manner, the terminal establishes the initial network link connection with the server by starting the heartbeat package process. Based on the initial network link connection, the terminal receives the business message pushed from the system. For example, after the terminal receives the business message from the server, the terminal can adjust the sending policy of heartbeat package according to the type of business message. Based on the sending policy of the heartbeat package, the network link connection can be maintained with the server to provide the pushing operation for the business message. As such, the pushing requirements of various application business messages can be satisfied on the mobile terminal and the power of the mobile terminal can be saved.

Figure 4:
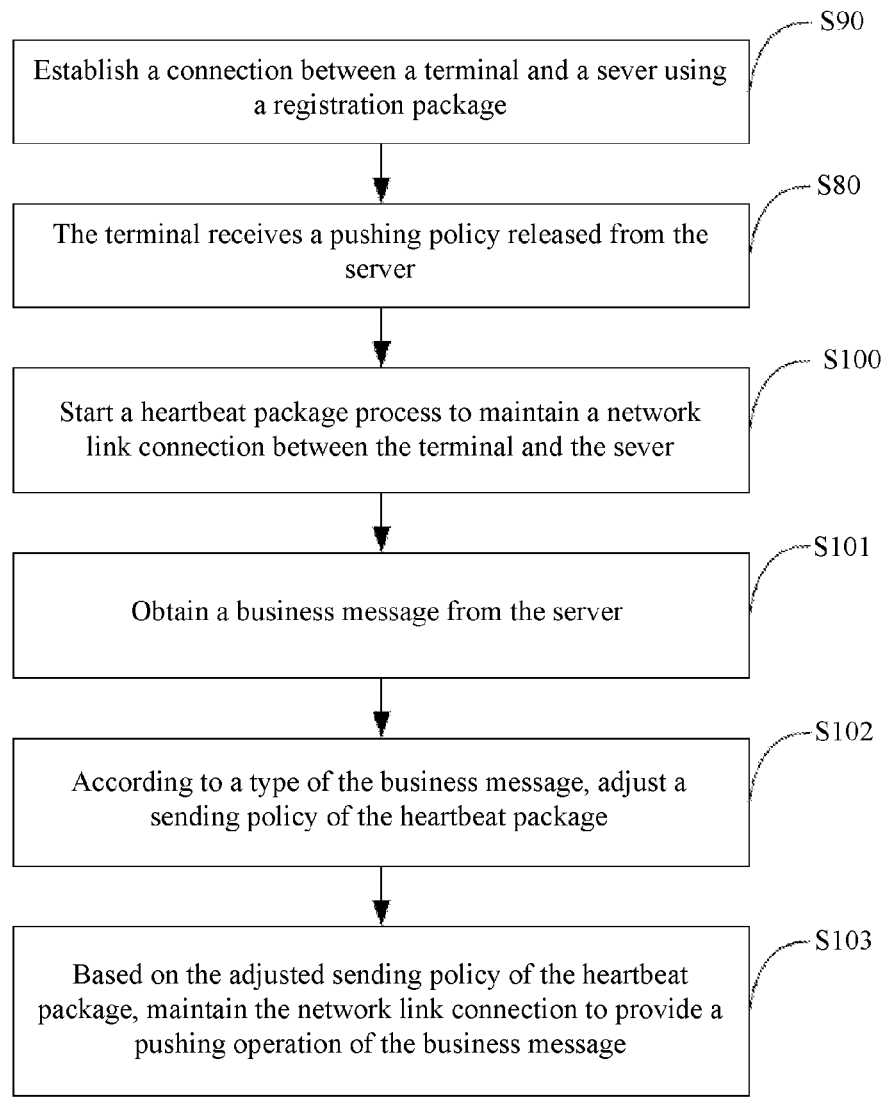
FIG. 4 depicts another exemplary method for pushing information consistent with various disclosed embodiments.

Based on the method depicted in FIG. 3, FIG. 4 depicts another exemplary method for pushing information consistent with various disclosed embodiments. For example, after Step S90 in FIG. 3 that a connection is established between the terminal and the sever using a registration package, further exemplary steps can be included as following.

In Step S80, the terminal receives a pushing policy released from the server.

Compared with the exemplary method depicted in FIG. 3, the exemplary method depicted in FIG. 4 further includes that the adjusting scheme for the sending policy of the heartbeat package is released from the server to the terminal. Specifically, after establishing the connection using the registration package between the terminal and the server, the server releases the pushing scheme to the terminal for the terminal to parse the received pushing scheme to obtain the adjusting scheme for the sending policy of the heartbeat package. Subsequently, after the terminal obtains the business message pushed from the system, the terminal can adopt the adjusting scheme for the sending policy of the heartbeat package according to the type of the business message so as to save the power of the mobile phone.

Figure 5:
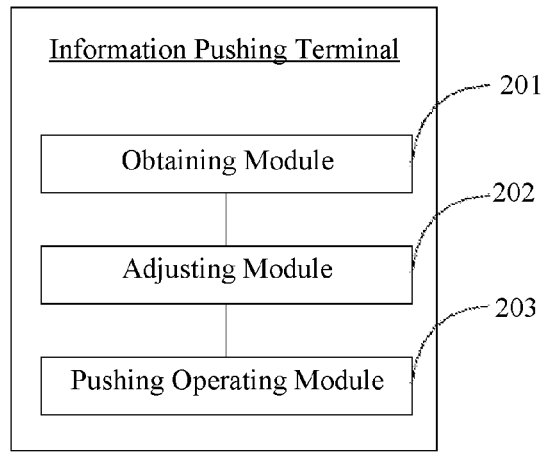
FIG. 5 depicts an exemplary terminal with functional modules for pushing information consistent with various disclosed embodiments.

FIG. 5 depicts an exemplary terminal with functional modules for pushing information consistent with various disclosed embodiments. The exemplary terminal can include an obtaining module 201, an adjusting module 202, and/or a pushing operating module 203.

The obtaining module 201 is configured to obtain a business message from the server. The adjusting module 202 is configured to adjust a sending policy of a heartbeat package according to a type of the business message.

The pushing operating module 203 is configured to maintain the network link connection with the server based on the sending policy of the adjusted heartbeat package to provide the pushing operation of the business message.

The disclosed information pushing system can include a terminal and/or a server. For example, for an Android mobile phone, the terminal side can be used for pushing module SDK (software development kit), including management of Android service and heartbeat package process, display of pushed message(s) on the mobile phone, and procedure processing of interaction with the server including sending a registration package, establishing a persistent connection with the server, sending the heartbeat package, pushing information return, etc.

The server can be used for management of request for persistent connection, business logic process, pushing information, statistical information landing, etc. In addition, the server can be used for push-web management backend, accessing management of application businesses (e.g., game business), etc.

Currently, when the terminal application pushes the business information, to maintain the network link connection between the terminal and the server (e.g., the TCP persistent connection), a fixed sending policy of heartbeat package has to be used. This leads to a large amount of power consumption of the mobile phone terminal.

As disclosed herein, according to different types of the business message pushed or released by the server, the heartbeat package process can be allowed to have different sleep time. As such, based on the types of the business message obtained by the terminal, the sending policy of the heartbeat package can be dynamically adjusted. Based on this policy, the network link connection between the terminal and the server can be maintained to provide the pushing operation of the business message and to save the power of mobile phone terminal.

In one embodiment when using an Android mobile phone as an example, after the mobile phone terminal is turned on or otherwise started, an "AndroidService" can be generated. The mobile phone terminal can then establish a connection with the server through a registration package. The terminal can start the heartbeat package process to send the heartbeat package to the server to maintain the network link connection with the server.

Through the network link connection, a pushing message of an application business can be obtained. During this process, according to different network types of the (mobile phone) terminal, the network link connection can be different. Generally, there are three exemplary network types for a mobile phone: WiFi, Net, and Wap network (which may take up a small portion over the network types). Because the network of WiFi and the Net both support the persistent connection, while the Wap network does not support the persistent connection, when the network type of mobile phone is WiFi or Net, the network link connection between the terminal and the server can be the persistent connection and the business message obtained by the terminal can be the business message pushed by the server.

When the network type of mobile phone is Wap, the network link connection between the terminal and the server is not the persistent connection. Then the pushing method needs to be changed to a pulling method. For example, the terminal can initiate the pulling of the business message from the server. In this manner, according to the network type, the terminal needs to switch between these two connection status (e.g., a persistent connection and a non-persistent connection). During this switching, the pushing procedure also needs to be switched.

In the example of using the Android system, registering the network connection status "BroadcastReceiver" can be used to receive broadcast information of a change of the network and to adjust the network link connection between the server and the terminal.

In one embodiment, the sending policy of the heartbeat package can be adjusted according to different types of the business message to save the power of the mobile phone, for example. The type of business message can include a real-time type of message, a timer-setting type of message, an instruction type of message, etc.

In an exemplary game marketing business, the pushing message can include a game real-time message, a game marketing activity message, a pushing instruction message, etc. The game real-time message can include real-time messages such as the latest game version updating message, game prop promoting (or discount) message, and/or other possible real-time messages. The game marketing activity message can include activity messages of game operations and planning, which has fixed pushing times. The pushing instruction message can include pushing a closing message, pushing temporarily-released pushing policy message, etc.

For a different type of the business message, the adjusting module 202 can use a different sending interval of the heartbeat package. In an example for the real-time type of message, according to an engagement that pushing message cannot be overly frequent and according to empirical data, the probability for receiving another real-time type of message in a short period of time (e.g., about 60 minutes) from after receiving a real-time type of message can be low. The sending interval of the heartbeat package can be adjusted to be greater than a benchmark time interval appointed by the terminal and the server, such that the network connection cost and the power cost running by the CPU can be reduced and saved. Then, after a pre-set time duration, the sending interval of heartbeat package can be restored back to the benchmark time interval.

In an example for the timer-setting type of message, the time for pushing message can be pre-set. Likewise, the sending interval of heartbeat package can be adjusted to be greater than a benchmark time interval appointed by the terminal and the server, in order to save the network connection cost and the power cost running by the CPU.

In an example for the instruction type of message, e.g., for pushing a closing message, when the terminal receives such pushing instruction message, the terminal can stop sending the heartbeat package and close the network link connection with the server to save the terminal power cost for network connection.

Subsequently, the pushing operating module 203 of the terminal side is configured to maintain the network link connection with the server based on the adjusted sending policy of the heartbeat package to provide the pushing operation of the business message. When the message pushing system performs the pushing operation of the business message, a pushing scheme is used according to the type of the network link connection.

When the network link connection is a persistent connection, the terminal receives the business message pushed by the server. When the network link connection is not a persistent connection, the terminal pulls the business message from the server. In addition, when the type of the business message is determined to be the timer-setting type, the terminal pulls the business message at a pre-set time before a set time.

In addition, the terminal may monitor the change of the network type in real-time. After a change of the network type has been detected, the network link status can be switched between the terminal and the server to ensure a regular or normal pushing of business message.

In this manner, after the terminal receives the business message from the server, the terminal can adjust the sending policy of heartbeat package according to the type of business message. Based on the sending policy of the heartbeat package, the network link connection can be maintained with the server to provide the pushing operation for the business message. As such, the pushing requirements of various application business messages can be satisfied on the mobile terminal and the power of the mobile terminal can be saved.

For example, the adjusting module 202 is further configured, when the type of the business message is determined to be a real-time type, to adjust the sending interval of the heartbeat package as the first pre-set time duration and to restore the sending interval of the heartbeat package to the benchmark time interval after the second pre-set time duration. The first pre-set time duration is greater than the benchmark time interval and less than the second pre-set time duration.

The adjusting module 202 is further configured, when the type of the business message is determined to be a timer-setting type, to adjust the sending interval of the heartbeat package to the third pre-set time duration, and to restore the sending interval of the heartbeat package to the benchmark time interval after the fourth pre-set time duration. The third pre-set time duration is greater than the benchmark time interval and less than the fourth pre-set time duration.

The adjusting module 202 is further configured to stop the heartbeat package process, when the type of the business message is determined to be the instruction-type. The above described first pre-set time duration may be the same as or different than the third pre-set time duration. The above described second pre-set time duration may be the same as or different than the fourth pre-set time duration. For example, for a game marketing business, a benchmark time interval for the heartbeat package can be appointed to be about 60 seconds.

In one embodiment when the terminal receives a pushing message of a game real-time type of message, according to an engagement that pushing message cannot be overly frequent and according to empirical data, the probability for receiving another real-time type of message in this short period of time (e.g., about 60 minutes) from after receiving a real-time type of message can be low.

As such, the sending interval of heartbeat package can be adjusted to be about 120 seconds (e.g., as the first pre-set time duration) for the heartbeat package process to sleep for about 120 seconds. Network connection cost and the power cost for running the CPU can be reduced and saved. Then after a time period of about 60 minutes (e.g., as the second pre-set time duration), the sending interval of the heartbeat package can be restored back to the benchmark time interval for about 60 seconds.

In another embodiment when the terminal receives a pushing message of a game activity listing type of message, an activity time can be recorded, and the pushing scheme can be changed to an initiative-pulling to pull the business message to inform the user at a pre-set time before the set time (i.e., the recorded time) for the activity using a timer. Meanwhile, the sending interval of heartbeat package can be adjusted to be about 120 seconds for the heartbeat package process to sleep for about 120 seconds, so as to save the network connection cost and the power cost for running the CPU.

In still another embodiment when the terminal receives a pushing message of an instruction message, which is, for example, a pushing instruction for closing, the persistent connection can be disconnected to stop the heartbeat package process, and thus to stop the exemplary Android service to save the mobile phone power cost for the network connection.

In addition, when the mobile phone is shut down or when the user closes a switch for the pushing, the pushing procedure can be closed to save the mobile phone power cost for the network connection. For example, the user can select a default setting of about 22:00 o'clock during nights to about 8:00 o'clock in mornings to close the pushing procedure to save the mobile phone power cost for the network connection.

As such, by using the above described dynamic policies, business pushing requirements can be satisfied. While saving the mobile phone data volume, the power of the mobile phone can be saved.

Note that the disclosed schemes for adjusting the sending policy of the heartbeat package according to the type of business message are not limited to the application scenarios described above, more policies and/or more subdivided policies may be adopted to adjust the policy for sending the heartbeat package.

In various embodiments, schemes for adjusting the sending policy of the heartbeat package according to the type of business message can be defined by the terminal-side, or can be released from the server to the terminal. For example, after establishing a connection between the terminal and the server through a registration package, the server can release the pushing policy to the terminal, and the terminal can parse the received pushing policy to obtain an adjusting policy for sending the heartbeat package.

Figure 6:
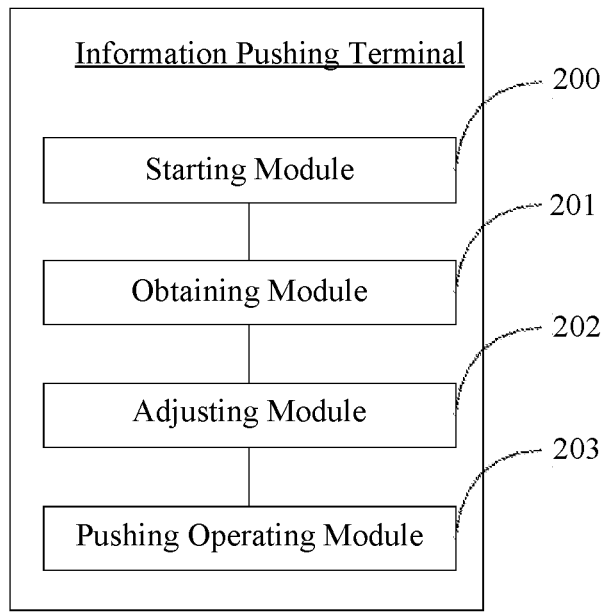
FIG. 6 depicts another exemplary terminal with functional modules for pushing information consistent with various disclosed embodiments.

Based on the exemplary terminal depicted in FIG. 5, FIG. 6 depicts another exemplary terminal with functional modules for pushing information consistent with various disclosed embodiments. For example, the exemplary terminal in FIG. 6 further includes a starting module 200.

The starting module 200 is configured to establish a connection of the terminal with the sever using a registration package and to start the heartbeat package process to maintain the network link connection with the server.

Based on the exemplary terminal as depicted in FIG. 5, FIG. 6 further includes a scheme of starting the heartbeat package process and establishing the initial network link connection with the server by the terminal.

In one embodiment when using an Android mobile phone as an example, after the mobile phone terminal is turned on or otherwise started, an "AndroidService" can be generated. The mobile phone terminal can then establish a connection with the server through a registration package. The terminal can start the heartbeat package process to send the heartbeat package to the server to maintain the network link connection with the server.

Through the network link connection, a pushing message of an application business can be obtained. During this process, according to different network types of the (mobile phone) terminal, the network link connection can be different. Generally, there are three exemplary network types for a mobile phone: WiFi, Net, and Wap network (which may take up a small portion over the network types). Because the network of WiFi and the Net both support the persistent connection, while the Wap network does not support the persistent connection, when the network type of mobile phone is WiFi or Net, the network link connection between the terminal and the server can be the persistent connection and the business message obtained by the terminal can be the business message pushed by the server.

When the network type of mobile phone is Wap, the network link connection between the terminal and the server is not the persistent connection. Then the pushing method needs to be changed to a pulling method. For example, the terminal can initiate the pulling of the business message from the server. In this manner, according to the network type, the terminal needs to switch between these two connection status (e.g., a persistent connection and a non-persistent connection). During this switching, the pushing procedure also needs to be switched.

In the example of using the Android system, registering the network connection status "BroadcastReceiver" can be used to receive broadcast information of a change of the network and to adjust the network link connection between the server and the terminal. By establishing the initial network link connection, the terminal can obtain the business message pushed from the system.

In this manner, the terminal establishes the initial network link connection with the server by starting the heartbeat package process. Based on the initial network link connection, the terminal receives the business message pushed from the system. For example, after the terminal receives the business message from the server, the terminal can adjust the sending policy of heartbeat package according to the type of business message. Based on the sending policy of the heartbeat package, the network link connection can be maintained with the server to provide the pushing operation for the business message. As such, the pushing requirements of various application business messages can be satisfied on the mobile terminal and the power of the mobile terminal can be saved.

Further, the starting module 200 is configured to receive the pushing policy released from the server after establishing the connection with the server using the registration package. That is, after establishing the connection using the registration package between the terminal and the server, the server releases the pushing scheme to the terminal for the terminal to parse the received pushing scheme to obtain the adjusting scheme for the sending policy of the heartbeat package. Subsequently, after the terminal obtains the business message pushed from the system, the terminal can adopt the adjusting scheme for the sending policy of the heartbeat package according to the type of the business message so as to save the power of the mobile phone.

Figure 7:
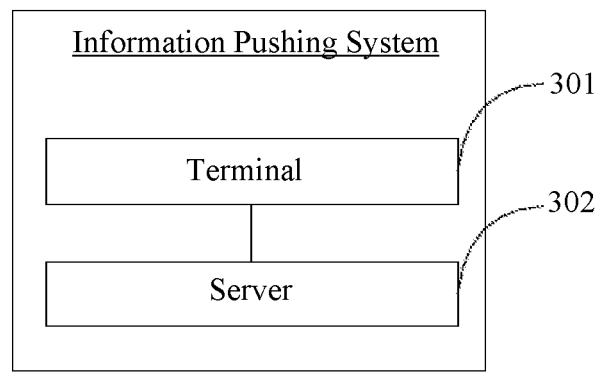
FIG. 7 depicts an exemplary system for pushing information consistent with various disclosed embodiments.

FIG. 7 depicts an exemplary system for pushing information consistent with various disclosed embodiments. The exemplary system includes: a terminal 301 and a server 302 connected with the terminal 301 by communication. The terminal 301 can be any terminal as described herein, e.g., in FIGS. 1-6.

The server 302 is configured to release a business message to the terminal 301. The network link connection can be maintained with the terminal 301 to perform the pushing operation of the business message, based on a sending policy of the heartbeat package adjusted by the terminal according to the type of the business message.

For example, for an Android mobile phone, the terminal 301 can be used for pushing module SDK (software development kit), including management of Android service and heartbeat package process, display of pushed message(s) on the mobile phone, and procedure processing of interaction with the server 302 including sending a registration package, establishing a persistent connection with the server 302, sending the heartbeat package, pushing information return, etc.

The server 302 can be used for management of request for persistent connection, business logic process, pushing information, statistical information landing, etc. In addition, the server 302 can be used for push-web management backend, accessing management of application businesses (e.g., game business), etc.

Currently, when the terminal 301 application pushes the business information, to maintain the network link connection between the terminal 301 and the server 302 (e.g., the TCP persistent connection), a fixed sending policy of heartbeat package has to be used. This leads to a large amount of power consumption of the mobile phone terminal.

As disclosed herein, according to different types of the business message pushed or released by the server 302, the heartbeat package process can be allowed to have different sleep time. As such, based on the types of the business message obtained by the terminal 301, the sending policy of the heartbeat package can be dynamically adjusted. Based on this policy, the network link connection between the terminal 301 and the server 302 can be maintained to provide the pushing operation of the business message and to save the power of mobile phone terminal.

In one embodiment when using an Android mobile phone as an example, after the mobile phone terminal 301 is turned on or otherwise started, an "AndroidService" can be generated. The mobile phone terminal 301 can then establish a connection with the server 302 through a registration package. The terminal 301 can start the heartbeat package process to send the heartbeat package to the server 302 to maintain the network link connection with the server 302. Through the network link connection, a pushing message of an application business can be obtained. During this process, according to different network types of the (mobile phone) terminal 301, the network link connection can be different.

Generally, there are three exemplary network types for a mobile phone: WiFi, Net, and Wap network (which may take up a small portion over the network types). Because the network of WiFi and the Net both support the persistent connection, while the Wap network does not support the persistent connection, when the network type of mobile phone is WiFi or Net, the network link connection between the terminal 301 and the server 302 can be the persistent connection and the business message obtained by the terminal 301 can be the business message pushed by the server 302.

When the network type of mobile phone is Wap, the network link connection between the terminal 301 and the server 302 is not the persistent connection. Then the pushing method needs to be changed to a pulling method. For example, the terminal 301 can initiate the pulling of the business message from the server 302. In this manner, according to the network type, the terminal 301 needs to switch between these two connection status (e.g., a persistent connection and a non-persistent connection). During this switching, the pushing procedure also needs to be switched.

In the example of using the Android system, registering the network connection status "BroadcastReceiver" can be used to receive broadcast information of a change of the network and to adjust the network link connection between the server 302 and the terminal 301.

In one embodiment, the sending policy of the heartbeat package can be adjusted according to different types of the business message to save the power of the mobile phone, for example. The type of business message can include a real-time type of message, a timer-setting type of message, an instruction type of message, etc.

In an exemplary game marketing business, the pushing message can include a game real-time message, a game marketing activity message, a pushing instruction message, etc. The game real-time message can include real-time messages such as the latest game version updating message, game prop promoting (or discount) message, and/or other possible real-time messages. The game marketing activity message can include activity messages of game operations and planning, which has fixed pushing times. The pushing instruction message can include pushing a closing message, pushing temporarily-released pushing policy message, etc.

As the type of the business message is different, the sending interval of the heartbeat package can be different. In an example for the real-time type of message, according to an engagement that pushing message cannot be overly frequent and according to empirical data, the probability for receiving another real-time type of message in a short period of time (e.g., about 60 minutes) from after receiving a real-time type of message can be low. The sending interval of the heartbeat package can be adjusted to be greater than a benchmark time interval appointed by the terminal 301 and the server 302, such that the network connection cost and the power cost running by the CPU can be reduced and saved. Then, after a pre-set time duration, the sending interval of heartbeat package can be restored back to the benchmark time interval.

In an example for the timer-setting type of message, the time for pushing message can be pre-set. Likewise, the sending interval of heartbeat package can be adjusted to be greater than a benchmark time interval appointed by the terminal 301 and the server 302, in order to save the network connection cost and the power cost running by the CPU.

In an example for the instruction type of message, e.g., for pushing a closing message, when the terminal 301 receives such pushing instruction message, the terminal 301 can stop sending the heartbeat package and close the network link connection with the server 302 to save the terminal power cost for network connection.

The terminal 301 can be configured to maintain a network link connection with the server 302 based on a sending policy of the adjusted heartbeat package to provide a pushing operation of the business message.

When the message pushing system performs the pushing operation of the business message, a pushing scheme is used according to the type of the network link connection. When the network link connection is a persistent connection, the terminal 301 receives the business message pushed by the server 302. When the network link connection is not a persistent connection, the terminal 301 pulls the business message from the server 302.

In addition, when the type of the business message is determined to be the timer-setting type, the terminal 301 pulls the business message at a pre-set time before a set time.

Further, the terminal 301 may monitor the change of the network type in real-time. After a change of the network type has been detected, the network link status can be switched between the terminal and the server to ensure a regular or normal pushing of business message.

In this manner, after the terminal 301 receives the business message from the server 302, the terminal 301 can adjust the sending policy of heartbeat package according to the type of business message. Based on the sending policy of the heartbeat package, the network link connection can be maintained with the server 302 to provide the pushing operation for the business message. As such, the pushing requirements of various application business messages can be satisfied on the mobile terminal and the power of the mobile terminal can be saved.

That the terminal 301 adjusts a sending policy of a heartbeat package according to a type of the business message may include the following exemplary steps.

Firstly, the type of business message can be determined. When the type of the business message is determined to be a real-time type, the terminal 301 can adjust the sending interval of the heartbeat package as the first pre-set time duration and to restore the sending interval of the heartbeat package to the benchmark time interval after the second pre-set time duration. The first pre-set time duration is greater than the benchmark time interval and less than the second pre-set time duration.

When the type of the business message is determined to be a timer-setting type, the terminal 301 can be further configured to adjust the sending interval of the heartbeat package to the third pre-set time duration, and to restore the sending interval of the heartbeat package to the benchmark time interval after the fourth pre-set time duration. The third pre-set time duration is greater than the benchmark time interval and less than the fourth pre-set time duration.

The terminal 301 is further configured to stop the heartbeat package process, when the type of the business message is determined to be the instruction-type. The above described first pre-set time duration may be the same as or different than the third pre-set time duration. The above described second pre-set time duration may be the same as or different than the fourth pre-set time duration.

For example, for a game marketing business, a benchmark time interval for the heartbeat package can be appointed between the client 301 and the server 302 to be about 60 seconds.

In one embodiment when the terminal 301 receives a pushing message of a game real-time type of message, according to an engagement that pushing message cannot be overly frequent and according to empirical data, the probability for receiving another real-time type of message in this short period of time (e.g., about 60 minutes) from after receiving a real-time type of message can be low.

As such, the sending interval of heartbeat package can be adjusted to be about 120 seconds (e.g., as the first pre-set time duration) for the heartbeat package process to sleep for about 120 seconds. Network connection cost and the power cost for running the CPU can be reduced and saved. Then after a time period of about 60 minutes (e.g., as the second pre-set time duration), the sending interval of the heartbeat package can be restored back to the benchmark time interval for about 60 seconds.

In another embodiment when the terminal 301 receives a pushing message of a game activity listing type of message, an activity time can be recorded, and the pushing scheme can be changed to an initiative-pulling to pull the business message to inform the user at a pre-set time before the set time (i.e., the recorded time) for the activity using a timer. Meanwhile, the sending interval of heartbeat package can be adjusted to be about 120 seconds for the heartbeat package process to sleep for about 120 seconds, so as to save the network connection cost and the power cost for running the CPU.

In still another embodiment when the terminal 301 receives a pushing message of an instruction message, which is, for example, a pushing instruction for closing, the persistent connection can be disconnected to stop the heartbeat package process, and thus to stop the exemplary Android service to save the mobile phone power cost for the network connection. In addition, when the mobile phone is shut down or when the user closes a switch for the pushing, the pushing procedure can be closed to save the mobile phone power cost for the network connection. For example, the user can select a default setting of about 22:00 o'clock during nights to about 8:00 o'clock in mornings to close the pushing procedure to save the mobile phone power cost for the network connection. As such, by using the above described dynamic policies, business pushing requirements can be satisfied. While saving the mobile phone data volume, the power of the mobile phone can be saved.

Note that the disclosed schemes for adjusting the sending policy of the heartbeat package according to the type of business message are not limited to the application scenarios described above, more policies and/or more subdivided policies may be adopted to adjust the policy for sending the heartbeat package.

In various embodiments, schemes for adjusting the sending policy of the heartbeat package according to the type of business message can be defined by the terminal 301, or can be released from the server 302 to the terminal 301. For example, after establishing a connection between the terminal 301 and the server 302 through a registration package, the server 302 can release the pushing policy to the terminal 301, and the terminal 301 can parse the received pushing policy to obtain an adjusting policy for sending the heartbeat package.

In the disclosed methods, terminals, and systems for pushing information, after the terminal receives the business message from the server, the terminal can adjust the sending policy of heartbeat package according to the type of business message. Based on the sending policy of the heartbeat package, the network link connection can be maintained with the server to provide the pushing operation for the business message. As such, the pushing requirements of various application business messages can be satisfied on the mobile terminal and the power of the mobile terminal can be saved.

It should be noted that, in the present disclosure each embodiment is progressively described, i.e., each embodiment is described and focused on difference between embodiments. Similar and/or the same portions between various embodiments can be referred to with each other. In addition, exemplary terminals and systems are described with respect to corresponding methods.

The disclosed methods, terminals and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data (or information) in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

A person of ordinary skill in the art can understand that the modules included herein are described according to their functional logic, but are not limited to the above descriptions as long as the modules can implement corresponding functions. Further, the specific name of each functional module is used for distinguishing from on another without limiting the protection scope of the present disclosure.

As used herein, the term "module" can be software objects executed on a computing system. A variety of components described herein including elements, modules, units, engines, and services can be executed in the computing system. The methods, terminals and/or systems can be implemented in a software manner. Of course, the methods, terminals and/or systems can be implemented using hardware. All of which are within the scope of the present disclosure.

In various embodiments, the disclosed modules can be configured in one apparatus (e.g., a processing unit) or configured in multiple apparatus as desired. The modules disclosed herein can be integrated in one module or in multiple modules. Each of the modules disclosed herein can be divided into one or more sub-modules, which can be recombined in any manner.

One of ordinary skill in the art would appreciate that suitable software and/or hardware (e.g., a universal hardware platform) may be included and used in the disclosed methods, terminals, and/or systems. For example, the disclosed embodiments can be implemented by hardware only, which alternatively can be implemented by software products only. The software products can be stored in a computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods, terminals, and systems for pushing information are provided. A terminal obtains a business message from a server and determines a type of the business message from a real-time type, a timer-setting type, and an instruction-type. When the type of the business message is determined to be the real-time type, the terminal adjusts a sending interval of a heartbeat package as a first pre-set time duration and restores the sending interval of the heartbeat package back to a benchmark time interval after a second pre-set time duration. The first pre-set time duration is greater than the benchmark time interval and less than the second pre-set time duration. The terminal maintains a network link connection with the server based on the sending policy of the heartbeat package to provide a pushing operation of the business message.

In the disclosed methods, terminals, and systems for pushing information, after the terminal receives the business message from the server, the terminal can adjust the sending policy of heartbeat package according to the type of business message. Based on the sending policy of the heartbeat package, the network link connection can be maintained with the server to provide the pushing operation for the business message. As such, by using the described dynamic policies, business pushing requirements can be satisfied. While saving the mobile phone data volume, the power of the mobile phone can be saved.

REFERENCE SIGN LIST

Starting module 200
Obtaining module 201
Adjusting module 202
Pushing operating module 203
Terminal 301 and a server 302
Environment 800
Communication network 802
Server 804
Terminal 806
Processor 902
Storage medium 904
Monitor 906
Communications 908
Database 910
Peripherals 912

What is claimed is:
1. A method for pushing information, comprising:
  obtaining, by a terminal, a business message from a server;
  determining a type of the business message from a real-time type, a timer-setting type, and an instruction-type;
  adjusting a sending policy of a heartbeat package based on a determination result of determining the type of the business message, comprising:
    when the type of the business message is determined to be the real-time type, adjusting a sending interval of the heartbeat package as a first pre-set time duration and restoring the sending interval of the heartbeat package back to a benchmark time interval after a second pre-set time duration, wherein the first pre-set time duration is greater than the benchmark time interval and less than the second pre-set time duration; and maintaining a network link connection with the server based on the sending policy of the heartbeat package to provide a pushing operation of the business message.

2. The method according to claim 1, wherein obtaining the business message includes:
receiving, by the terminal, the business message pushed from the server; or
pulling, by the terminal, the business message from the server.

3. The method according to claim 1, wherein, after determining the type of the business message, the method further includes:
when the type of the business message is determined to be the timer-setting type, adjusting the sending interval of the heartbeat package as a third pre-set time duration, and restoring the sending interval of the heartbeat package back to the benchmark time interval after a fourth pre-set time duration, wherein the third pre-set time duration is greater than the benchmark time interval and less than the fourth pre-set time duration.

4. The method according to claim 1, wherein, after determining the type of the business message, the method further includes:
when the type of the business message is determined to be the instruction-type, stopping a heartbeat package process.

5. The method according to claim 1, wherein, before obtaining the business message from the server, the method further includes:
establishing, by the terminal, the network link connection with the sever through a registration package; and
starting the heartbeat package process to maintain the network link connection with the server.

6. The method according to claim 5, wherein, after establishing the network link connection with the server through the registration package, the method further includes:
receiving, by the terminal, a pushing policy released from the server.

7. The method according to claim 5, wherein the pushing operation of the business message includes:
receiving, by the terminal, the business message pushed by the server, when the network link connection is a persistent connection; or
pulling, by the terminal, the business message from the server, when the network link connection is not a persistent connection.

8. The method according to claim 7, wherein the pushing operation of the business message further includes:
when the type of the business message is determined to be the timer-setting type, pulling, by the terminal, the business message at a pre-set time before a set time.

9. The method according to claim 7, further including:
switching, by the terminal, a network link status between the terminal and the server, after the terminal detects a change of a network type.

10. The method according to claim 1, wherein the real-time type of the business message comprises: a latest game version updating message or a game prop promoting message; the timer-setting type of the business message comprises: an activity message of game operations and planning having a fixed pushing time; and the instruction-type of the business message comprises: a closing message for temporarily stopping pushing messages.

11. A terminal for pushing information, comprising:
a memory; and
a processor coupled to the memory, wherein the processor is configured to:
obtain a business message from a server;
determine a type of the business message from a real-time type, a timer-setting type, and an instruction-type;
adjust a sending policy of a heartbeat package based on a determination result of determining the type of the business message, comprising:
adjusting a sending interval of the heartbeat package as a first pre-set time duration and restore the sending interval of the heartbeat package back to a benchmark time interval after a second pre-set time duration, when the type of the business message is determined to be the real-time type, wherein the first pre-set time duration is greater than the benchmark time interval and less than the second pre-set time duration; and
maintain a network link connection with the server based on the sending policy of the heartbeat package to provide a pushing operation of the business message.

12. The terminal according to claim 11, wherein the processor is further configured to:
receive the business message pushed from the server or pull the business message from the server.

13. The terminal according to claim 11, wherein the processor is further configured to:
adjust the sending interval of the heartbeat package to a third pre-set time duration and restore the sending interval of the heartbeat package back to the benchmark time interval after a fourth pre-set time duration, when the type of the business message is determined to be the timer-setting type; and stop a heartbeat package process, when the type of the business message is determined to be the instruction-type, wherein the third pre-set time duration is greater than the benchmark time interval and less than the fourth pre-set time duration.

14. The terminal according to claim 11, wherein the processor is further configured to:
establish the network link connection with the sever through a registration package and start the heartbeat package process to maintain the network link connection with the server.

15. The terminal according to claim 14, wherein the processor is further configured to:
receive a pushing policy released from the server, after establishing the network link connection with the sever using the registration package.

16. The terminal according to claim 14, wherein the processor is further configured to:
receive the business message pushed from the server, when the network link connection is a persistent connection; or pull the business message from the server, when the network link connection is not a persistent connection.

17. The terminal according to claim 16, wherein the processor is further configured to:
pull the business message at a pre-set time before a set time, when the type of the business message is determined to be the timer-setting type.

18. The terminal according to claim 16, wherein the processor is further configured to:
switch a network link status between the terminal and the server, after a change of a network type is detected.

19. A system for pushing information, comprising:
a server and a terminal, the terminal including a memory and a processor coupled to the memory, wherein the processor is configured to:

obtain a business message from the server;

determine a type of the business message from a real-time type, a timer-setting type, and an instruction-type;

adjust a sending policy of a heartbeat package based on a determination result of determining the type of the business message, comprising:

adjusting a sending interval of the heartbeat package as a first pre-set time duration and to restore the sending interval of the heartbeat package back to a benchmark time interval after a second pre-set time duration, when the type of the business message is determined to be the real-time type, wherein the first pre-set time duration is greater than the benchmark time interval and less than the second pre-set time duration; and maintain a network link connection with the server based on the sending policy of the heartbeat package to provide a pushing operation of the business message;

wherein the server is configured to release the business message to the terminal; to maintain the network link connection with the terminal based on the sending policy of the heartbeat package adjusted by the terminal according to the type of the business message; and to perform the pushing operation of the business message.

* * * * *